(12) United States Patent
McCarthy et al.

(10) Patent No.: US 8,376,208 B1
(45) Date of Patent: Feb. 19, 2013

(54) PURGE PLUG FOR WELDING APPLICATIONS

(75) Inventors: John McCarthy, Ontario, CA (US);
Phillip Espinoza, Corona, CA (US)

(73) Assignee: Flow Dynamics, Inc., Ontario (CA)

( * ) Notice: Subject to any disclaimer, the term of this patent is extended or adjusted under 35 U.S.C. 154(b) by 0 days.

(21) Appl. No.: 12/690,745

(22) Filed: Jan. 20, 2010

Related U.S. Application Data

(60) Provisional application No. 61/145,928, filed on Jan. 20, 2009.

(51) Int. Cl.
*B23K 37/00* (2006.01)
*B23K 9/16* (2006.01)
*F16L 55/11* (2006.01)

(52) U.S. Cl. .............. 228/57; 228/42; 228/60; 228/219; 219/72; 219/74; 138/89

(58) Field of Classification Search ............ 228/57, 228/60, 119, 42, 219; 219/72, 74; 138/89
See application file for complete search history.

(56) References Cited

U.S. PATENT DOCUMENTS

| | | | | |
|---|---|---|---|---|
| 4,254,321 A | * | 3/1981 | Hallenbeck | 219/72 |
| 4,415,114 A | * | 11/1983 | Hallenbeck | 228/57 |
| 4,462,430 A | * | 7/1984 | Anthony et al. | 138/89 |
| 5,100,043 A | * | 3/1992 | Hallenbeck | 228/42 |
| 5,126,526 A | * | 6/1992 | Schnorrer | 219/74 |
| 5,187,343 A | * | 2/1993 | Edwards | 219/74 |

OTHER PUBLICATIONS

Website, "TechSouth Purge Plugs", TechSouth, Inc. (www.techsouthinc.com/purge/tspurge.html), Accessed Nov. 30, 2009.
Website, "DWS Orbital Welding Purge Tools", Digital Welding Systems, Inc. (www.orbitalwelding.com/Pages/07-Purge.htm), Accessed Nov. 30, 2009.

* cited by examiner

*Primary Examiner* — Devang R Patel
(74) *Attorney, Agent, or Firm* — Knobbe Martens Olson & Bear, LLP

(57) ABSTRACT

A purge plug for welding applications is provided that can be interchangeably used to seal tubing, pipes, or the like of various diameter or cross-sectional area. The purge plug has a central body with a male connector and a diffuser disposed on the end portions. The purge plug also includes one or more flexible seals annularly disposed around the central body. In some implementations, the diameter of the flexible seals is slightly larger than the diameter of the tubing or pipe. When the purge plug is inserted into the tubing or pipe, the resiliency of the seal allow the seal to expand mechanically and flex against the inner walls of the tubing, thus sealingly engage with the inner walls.

6 Claims, 2 Drawing Sheets

PURGE PLUG FOR WELDING APPLICATIONS

CROSS-REFERENCE TO RELATED APPLICATIONS

This application claims the benefit of priority under 35 U.S.C. §119(e) of U.S. Provisional Application No. 61/145,928 filed on Jan. 20, 2009, the entirety of which is incorporated herein by reference.

BACKGROUND OF THE INVENTION

1. Field of the Invention

This invention relates generally to welding accessories, and more particularly, to a purge plug used for purging gas from a welding region.

2. Description of the Related Art

Welding is a generally known industrial fabrication process that involves fusing metals or thermoplastics by heat and/or pressure. In some applications, the process requires the welding region to be purged of gases such as oxygen and nitrogen in order to reduce porosity and brittleness in the welded joint. Purging of welding regions in tubing or pipes for example is typically performed by attaching a gas tube to inject inert gas into the opening and sealing the opening with tape. The taping process increases the material and labor cost of the process. Certain purge plug systems have been developed to replace the use of tape. However, prior art purge plug systems typically utilize a threading mechanism to attach the purge plug to the work piece. Moreover, different sizes of purge plugs are typically required for tubing or pipes of different cross-sectional areas. This limits the interchangeability of using the same purge plug for different pipe or tubing sizes. Thus, there is still a need for an improved purge plug for welding applications.

SUMMARY OF THE INVENTION

The systems, methods, and devices of the present invention each have several aspects, no single one of which is solely responsible for its desirable attributes. Without limiting the scope of this invention, its more prominent features will now be discussed briefly.

In one embodiment, the present disclosure provides an interchangeable purge plug for welding applications. The purge plug is adapted to assist purging of gas, such as oxygen or nitrogen, from a welding region located in a tubing, pipe, or the like. The purge plug is designed so that it can be interchangeably used to plug tubing and pipes having different inner diameter or cross-sectional areas. In one embodiment, the purge plug comprises a central body having a proximal end and a distal end; and at least one sealing member disposed annularly around the central body and extending outwardly therefrom. The central body can take on a number of different configurations such as tubular, square, or triangular. The purge plug can be adapted to plug tubing and pipes of various cross-sectional configurations such as circular, square, or triangular. Preferably, the sealing member is sufficiently resilient and capable of expanding or decompressing mechanically to cover and substantially seal a space between the central body of the purge plug and the inner walls of a tubing or pipe. The purge plug further comprises a male connector disposed on the proximal end of the central body; and a diffuser disposed on the distal end of the tubular body. In certain implementations, the purge plug is adapted to be used interchangeably with tubing or pipes of a wide range of inner diameter, such as for example from between about 2.54 cm to 15.24 cm (about 1 inch to 6 inches), or between about 2.54 cm to 7.62 cm (about 1 to 3 inches), or between about 2.54 cm to 5.08 cm (about 1 to 2 inches), or between about 2.54 cm to 3.81 (about 1 to 1½ inches). In some implementations, the diameter of the sealing member is at least about 5%, 10%, 15%, 20%, 25%, 30%, 35%, 40%, 45%, or 50% greater than the diameter of the tubing or pipe.

In another embodiment, the present disclosure provides an easy-to-use purge plug assembly that is adapted to plug the opening of a tubing or pipe without the use of threading or other mechanical means. The purge plug utilizes a plurality of sealing members that are sufficiently resilient and capable of forming an interference fit with the inner walls of the tubing or pipe when inserted therein. The sealing members are configured to sealingly engage with the inner walls of the tubing or pipe as soon as the purge plug is inserted into the opening. Further, the resilient sealing members are sized to easily bend and flex, which permit easy placement and removal of the purge plug.

In yet another embodiment, the present disclosure provides a method of substantially sealing a tubing for purging the tubing of gas for welding applications. The method comprises placing a purge plug in an opening of the tubing, wherein the tubing has an inner diameter and wherein the purge plug has a central body and at lease one annular flexible sealing member extending outwardly from the central body in a manner such that the diameter of the flexible sealing member is greater than the inner diameter of the tubing. The method further comprises inserting the purge plug into the tubing by pushing the annular flexible sealing member against the inner walls of the tubing so that edge portions of the annular sealing member bends and wherein the bent edge portions of the flexible sealing member mechanically decompress and push against the inner walls so as to substantially seal the opening between the central body and the inner walls of the tubing.

In yet another embodiment, the present disclosure provides a welding gas purging assembly comprising a first tubing having a first inner diameter, a second tubing having a second inner diameter, and a sealing device. Preferably, the sealing device has a central body and at least one flexible sealing member annularly disposed around the central body and extending outwardly therefrom in a plane substantially perpendicular to the longitudinal axis of the central body. Preferably, the diameter of the at least one flexible sealing member is greater than the first or second inner diameter. Preferably, the at least one flexible sealing member is adapted to flex when inserted into the first or second tubing and push against the inner walls of the first or second tubing to cover the space between the inner walls of the tubing and the central body of the sealing device. In one implementation, the diameter of the sealing device is about 5%-40% greater than the diameter of the first or second tubing. In another implementation, the inner diameter of the first tubing is between about 2.54 cm to about 15.24 cm.

DETAILED DESCRIPTION OF THE PREFERRED EMBODIMENTS

Figure 1:
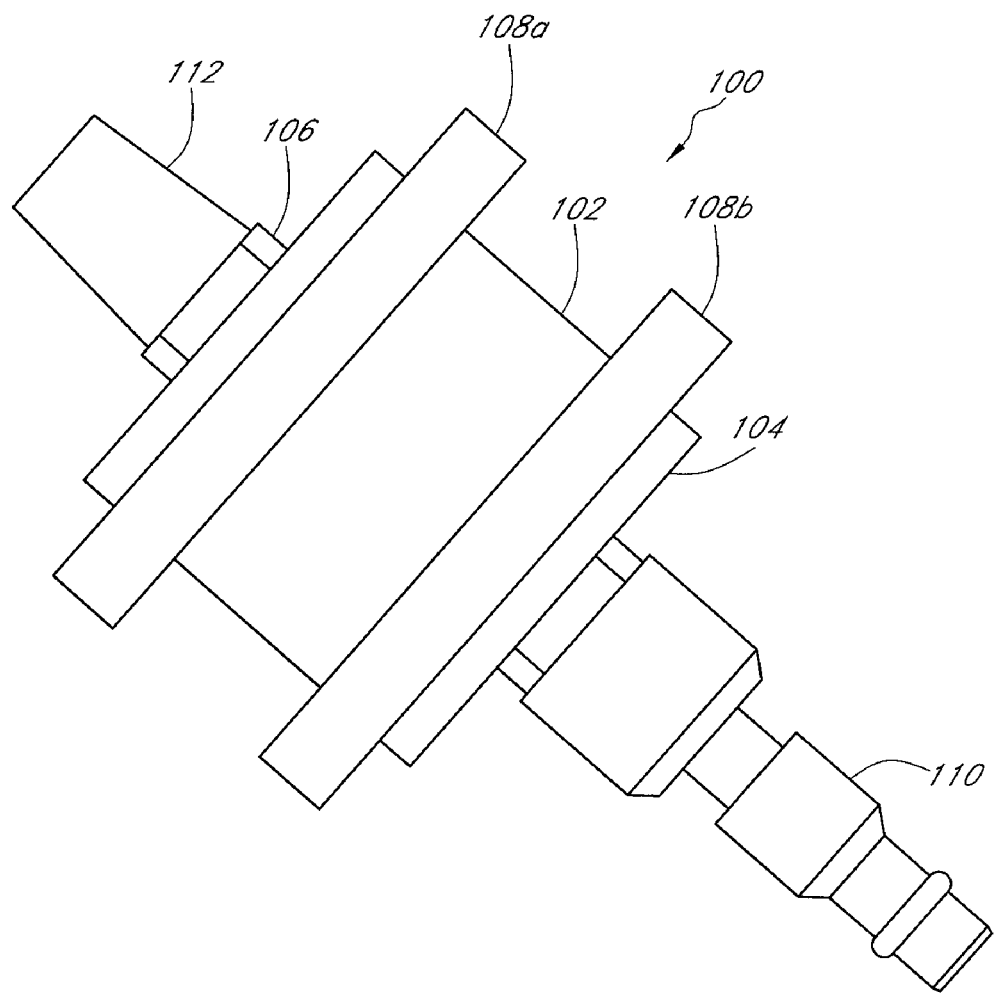
FIG. 1 is an illustration of a purge plug of one preferred embodiment of the present invention.

FIG. 1 illustrates a purge plug 100 of one preferred embodiment of the present disclosure. The purge plug 100 generally comprises a tubular body 102 having a proximal end 104 and a distal end 106, and a plurality of sealing members 108a, 108b adapted to sealingly engage with the inner walls of a tubing or pipe. Preferably, the tubular body 102 is substantially rigid. In one implementation, the tubular body 102 has a diameter of between about 1.9 cm to about 12.7 cm (about ¾ inch to about 5 inches) and a length of between about 3.81 cm to about 5.08 cm (about 1½ inch to about 2 inches).

As shown in FIG. 1, the sealing members 108a, 108b are disposed annularly around the tubular body 102 in a spaced apart arrangement and extending outwardly in a plane substantially perpendicular to a longitudinal axis of the tubular body 102. In one embodiment, the purge plug has two sealing members that are spaced apart by about 1.27 cm to about 3.175 cm (about ½ inch to about 1¼ inch). In some embodiments, multiple spaced apart sealing members are used to improve the effectiveness of sealing the tubing. In certain preferred implementations, each sealing member is made of a flexible and resilient material such as high temperature resistant silicone. In one preferred implementation, each sealing member has a thickness of between about 0.6 cm to about 0.673 cm (about 0.235 inch to about 0.265 inch). In another preferred implementation, each sealing member has a thickness of between about 0.51 cm to about 1 cm (about 0.2 inch to about 0.4 inch). In some embodiments, the sealing members are each configured with a different thickness.

The sealing members can be formed of a flexible material such as a disc that is sandwiched in the tubular body or alternatively, the sealing members can be formed of a flexible material that is attached annularly to the circumference of the tubular body. In one implementation, each sealing member has a diameter that is between about 2.54 cm to about 15.24 cm (about 1 inch to about 6 inches), or in some embodiments a diameter that is about 5% to about 35% greater than the inner diameter of the tubing or pipe. In some other embodiments, the sealing member can be formed of an annular strip of flexible material that is adapted to couple with the tubular body of the purge plug. Preferably, each sealing member extends outwardly from the central body in a manner such that the distance of the longest chord extending from one edge of the sealing member, through the center of the tubular body, to the opposite edge of the sealing member is greater than the inner diameter of the tubing or pipe.

As also shown in FIG. 1, the purge plug 100 further comprises a male connector 110 disposed on the proximal end 104 of the tubular body 102 and a diffuser 112 disposed on the distal end 106 of the tubular body 102. In certain preferred embodiments, the male connector 110 is pivotable and adapted to connect with various inert gas lines known in the art.

Advantageously, the purge plug of preferred embodiments has a substantially rigid tubular body that is sized to be easily inserted into tubing or pipe of various diameter, while the flexible, resilient sealing members disposed annularly around the tubular body are capable of expanding or decompressing mechanically to fill the space between the tubular body and the inner walls of the tubing or pipe. In preferred implementations, the purge plug 100 can be used to purge gas from tubing having inner diameter from about 2.54 cm to about 15.24 cm (about 1 inch to about 6 inches). Further, the sealing members are configured with a thickness that is sufficiently thin so that each sealing member can be easily flexed when being inserted into a tubing or pipe and yet sufficiently rigid so that the sealing member can sealingly engage with the inner walls of the tubing or pipe. In some embodiments, the sealing member is a thin flap of silicone that can be easily flexed.

Figure 2:
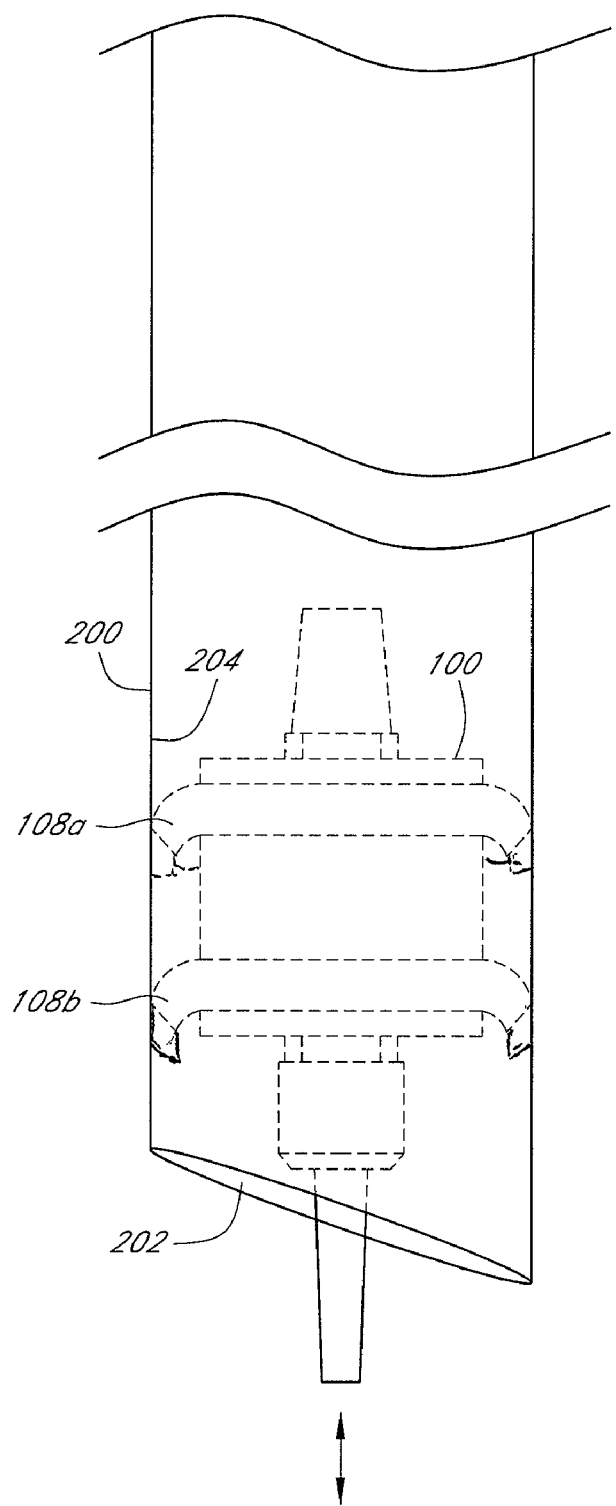
FIG. 2 is a schematic cross-sectional view of a tubing to be purged installed with a purge plug of one preferred embodiment of the present invention.

FIG. 2 illustrates the manner in which the purge plug 100 of a preferred embodiment can be used to assist gas purging from a tubing 200 to be welded. While the illustrated tubing 200 has a circular cross-sectional area, the purge plug 100 can be adapted to plug tubing of different cross-sectional configurations, such as square or triangular, by modifying the configuration of the sealing members to suit the particular configuration.

In use, the purge plug 100 is inserted into an opening 202 of the tubing 200 in a manner such that the sealing members 108a, 108b sealingly engage with the inner walls 204 of the tubing by forming an interference fit. The flexibility of the sealing members allow the purge plug to be easily inserted into the tubing and the resiliency of the sealing members allow the sealing members to expand or decompress mechanically, such as flexing against the inner walls of the tubing, to sealingly engage with the inner walls once the purge plug is positioned inside the tubing. In certain implementations, the purge plug 100 has multiple sealing members 108a, 108b arranged in a spaced apart relationship to improve the effectiveness of sealing. As shown in FIG. 2, the purge plug 100 can be easily inserted in the tubing 200 with the sealing members sized and shaped to sealingly engage with the inner walls of the tubing. Advantageously, the purge plug 100 can be used to seal tubing or pipes of different diameter or cross-sectional area because the sealing members 108a, 108b have a larger diameter than that of standard size tubing. In certain preferred embodiments, the sealing members are sufficiently flexible such that the edges bend downwardly as the purge plug is inserted into a tubing, and the sealing members are also sufficiently resilient such that they mechanically expand and flex against the inner walls of the tubing to form an interference fit.

The foregoing description of the preferred embodiment of the present invention has shown, described and pointed out the fundamental novel features of the invention. It will be understood that various omissions, substitutions, and changes in the form of the detail of the apparatus as illustrated as well as the uses thereof, may be made by those skilled in the art, without departing from the spirit of the invention. Consequently, the scope of the invention should not be limited to the foregoing discussions, but should be defined by appended claims.

What is claimed is:

1. A purge plug for sealing a tubing for welding applications, comprising:
   a tubular body having a proximal end and a distal end;
   a plurality of sealing members disposed annularly around the tubular body and extending outwardly therefrom, each of said sealing members having a diameter that is greater than the diameter of the tubing, each of said sealing members is sufficiently resilient and capable of decompressing mechanically to cover a space between the tubular body and inner walls of the tubing such that an edge portion of the sealing member bends and mechanically expands and pushes against the inner walls of the tubing so as to seal the opening between the tubular body and the inner walls of the tubing so that purge gas in the space cannot pass through the sealing members, wherein said sealing members are each configured with a different thickness of between about 0.51 cm to about 1 cm;
   a connector disposed on the proximal end of the tubular body, said connector is pivotable and adapted to connect to a gas line; and
   a diffuser disposed on the distal end of the tubular body.

2. The purge plug of claim 1, wherein the purge plug is adapted to be used interchangeably to plug a tubing having diameter between about 2.54 cm to about 15.24 cm.

3. The purge plug of claim 1, wherein at least one sealing member is made of high temperature resistant silicone and has a thickness of between about 0.6 cm to about 0.67 cm.

4. The purge plug of claim 1, wherein the purge plug comprises two sealing members arranged in a spaced apart relationship.

5. The purge plug of claim 4, wherein the distance between the two sealing members is between about 1.27 cm to about 3.18 cm.

6. The purge plug of claim 1, wherein the tubing has a substantially circular cross-sectional area.

* * * * *